(12) United States Patent
Horton

(10) Patent No.: US 6,647,352 B1
(45) Date of Patent: Nov. 11, 2003

(54) DYNAMIC ATTITUDE MEASUREMENT METHOD AND APPARATUS

(75) Inventor: Michael A. Horton, Los Gatos, CA (US)

(73) Assignee: Crossbow Technology, San Jose, CA (US)

(*) Notice: Subject to any disclaimer, the term of this patent is extended or adjusted under 35 U.S.C. 154(b) by 7 days.

(21) Appl. No.: 10/136,955

(22) Filed: May 1, 2002

Related U.S. Application Data

(63) Continuation-in-part of application No. 09/326,738, filed on Jun. 4, 1999, now Pat. No. 6,421,622.
(60) Provisional application No. 60/088,160, filed on Jun. 5, 1998.

(51) Int. Cl.[7] .............................................. G01C 17/00
(52) U.S. Cl. ..................................................... 702/151
(58) Field of Search ........................... 33/338; 701/200; 702/150, 151, 153

(56) References Cited

U.S. PATENT DOCUMENTS

| | | | |
|---|---|---|---|
| 4,038,876 A | * 8/1977 | Morris | 73/1.38 |
| 4,134,681 A | * 1/1979 | Elmer | 356/139.06 |
| 4,318,300 A | 3/1982 | Maughmer | |
| 4,399,692 A | 8/1983 | Hulsing, II et al. | |
| 4,454,756 A | 6/1984 | Sharp et al. | |
| 4,827,624 A | 5/1989 | Franklin et al. | |
| 4,914,598 A | 4/1990 | Krogmann et al. | |
| 5,031,330 A | 7/1991 | Stuart | |
| 5,148,604 A | 9/1992 | Bantien | |
| 5,172,323 A | * 12/1992 | Schmidt | 701/220 |
| 5,210,954 A | 5/1993 | Schafler | |
| 5,237,753 A | 8/1993 | Carlson et al. | |
| 5,241,850 A | 9/1993 | Kawate | |
| 5,287,628 A | 2/1994 | Yamaguchi et al. | |
| 5,335,190 A | 8/1994 | Nagle et al. | |
| 5,351,539 A | 10/1994 | Ziegenbein et al. | |
| 5,381,604 A | 1/1995 | Heidel et al. | |
| 5,392,112 A | 2/1995 | Nakamura | |
| 5,400,033 A | 3/1995 | Hablani | |
| 5,615,132 A | * 3/1997 | Horton et al. | 703/7 |
| 5,819,206 A | * 10/1998 | Horton et al. | 702/150 |
| 6,061,611 A | 5/2000 | Whitmore | |
| 6,088,653 A | * 7/2000 | Sheikh et al. | 701/214 |
| 6,176,837 B1 | * 1/2001 | Foxlin | 600/595 |
| 6,205,401 B1 | 3/2001 | Pickhard et al. | |
| 6,421,622 B1 | * 7/2002 | Horton et al. | 702/95 |

OTHER PUBLICATIONS

Chung, D; Lee, J; Park, C; Park, H;"Strapdown INS Error Model for Multiposition Alignment" IEEE Transactions On Aerospace And Electronic Systems; Vol 32 No. 4; Oct. 1996; pp1362–1366.*

Randle, J; Horton, M;"Low Cost Navigation Using Micro-Machined Technology";IEEE Conference On Intelligent Transportation System; 1997; pp1064–1067.*

Creamer, G; DeLaHunt, P; Gates, S; Levensons, M;"Attitude Determination and Control of Clemintine During Lunar Mapping"; Journal Of Guidance Control And Dynamics; Vol 19 No. 3; May–Jun. 1996; pp 505–511.*

(List continued on next page.)

*Primary Examiner*—John Barlow
*Assistant Examiner*—Douglas N Washburn
(74) *Attorney, Agent, or Firm*—Fenwick & West LLP

(57) ABSTRACT

A method and system attitude of an accelerating object by measuring acceleration with accelerometers in three orthogonal axes and measuring angular rate with angular rate sensors disposed about each such axis to compute attitude of the object accurately relative to a vertical axis. A processor updates a quaternion representation of attitude based upon the angular rate of the object, and a corrective rate signal is determined from level frame acceleration as a reference for a Kalman filter in calculating the attitude of the object.

12 Claims, 7 Drawing Sheets

OTHER PUBLICATIONS

Mehra, R; Seereeram, S; Bayard, D; Hadaegh, F;"Adaptive Kalman Filtering, Failure Detection and Identification for Spacecraft Attitude Estimation";Proceedings Of $4^{th}$ IEEE Conference On Control Applications; 1995; pp 176–181.*

Wu, A; Hein, D;"Stellar Inertial Attitude Determination for Leo Spacecraft"; Proceedings Of $35^{th}$ IEEE Conference On Decision And Control; Vol 3 No. 11–13; 1996; pp 3236–3244.*

Jiang, Y; Lin, Y;"Error Analysis of Quaternion Transformations [Interial Navigation]";IEEE Transactions On Aerospace And Electronic Systems; Vol 27 Issue 4; 1991; pp 634–639.*

Gusinsky, V; Lestnchevsky, V; Iimanovich, Y; Musoff, H; Schmidt, G;"New Procedure for Deriving Optimized Strapdown Attitude Algorithms"; Journal Of Guidance Control And Dynamics; Vol 20 No. 4; Jul.–Aug. 1997; pp 673–680.*

Savage, P;"Strapdown Inertial Navigation Integration Algorithm Design. 1. Attitude Algorithms"; Journal Of Guidance Control And Dynamics; Vol 21 No. 1; Jan.–Feb. 1998; pp 19–28.*

Vathsal, S;"Spacecraft Attitude Determination Using a Second–Order Nonlinear Filter"; Journal Of Guidance Control And Dynamics; Vol 10 No. 6; Nov.–Dec. 1987; pp 559–566.*

McKern, R; Musoff, H;"Strapdown Attitude Algorithms From a Geometric Viewpoint"; Journal Of Guidance Control And Dynamics; Vol 4 No. 6; Nov.–Dec. 1981; pp 657–661.*

Aramanovitch, L;"Quaternion Non–Linear Filter for Estimation of Rotating Body Attitude";Mathematical Methods In The Applied Sciences; Vol 18 No. 15; Dec. 1995; pp 1239–1255.*

Schultz, R; Keyes, C;"Airborne IRP Alignment Using Acceleration and Angular Rate Matching";$14^{th}$ Joint Automatic Control Conference Of The American Control Council; Jun. 1973; pp 427–436.*

Bar–Itzhack, I; Reiner, J;"Recursive Attitude Determination From Vector Observations: Direction Cosine Matrix Identification"; Journal Of Guidance Control And Dynamics; Vol 7 No. 1; Jan.–Feb. 1984; pp 51–56.*

Reynolds, R;"Quaternion Parameterization and a Simple Algorithm for Global Attitude Estimation"; Journal Of Guidance Control And Dynamics; Vol 21 No. 4; Jul.–Aug. 1998; pp 669–671.*

Guo–Shing–Huang; Jyh–Ching–Juang;"Application of Nonlinear Kalman Filter Approach in Dynamic GPS–Based Attitude Determination";Proceedings Of $40^{th}$ Midwest Symposium On Circuits And Systems; Vol 2; Aug. 3–6, 1997; pp 1440–1444.*

Markley, F; Berman, N; Shaked, U;"Deterministic EKFLike Estimator for Spacecraft Attitude Estimation";Proceedings Of 1994 American Control Conference; Vol 1;pp 247–251.*

Weiss, H;"Quaternion Based Rate/Attitude Tracking System With Application to Gimbal Attitude Control"; Proceedings IEEE Conference On Control And Applications; 1989; pp 488–494.*

Berman, Z;"On Range and Attitude Estimation";IEEE Position Location And Navigation Symposium; Apr. 11–15, 1994; pp 344–347.*

L. Moskowitz, "Part I: Measurement of Applied Acceleration—Accelerometer Calibration," *Instruments & Control Systems*, Feb. 1961, pp. 257–1996.

ADXL50/ADXL05 Evaluation Modules, Analog Devices, Inc., 1996.

* cited by examiner $f_B$ = compensated Bandwidth

DYNAMIC ATTITUDE MEASUREMENT METHOD AND APPARATUS

RELATED APPLICATIONS

This application is a continuation-in-part of application Ser. No. 09/326,738, entitled "DYNAMIC ATTITUDE MEASUREMENT SENSOR AND METHOD", filed on Jun. 4, 1999 by M. Horton, et al. now U.S. Pat. No. 6,421,622, which claims priority from U.S. Provisional Application Ser. No. 60/088,160, filed on Jun. 5, 1998, by Michael A. Horton, entitled "DYNAMIC ATTITUDE MEASUREMENT SENSOR AND METHOD", which applications are fully incorporated herein by reference.

FIELD OF THE INVENTION

This invention relates to the measurement of attitude of accelerating bodies, and more particularly to attitude sensors and control systems.

BACKGROUND OF THE INVENTION

Certain known techniques for measuring and controlling attitude of a moving body commonly rely upon a gyroscope spinning about a vertical axis, or upon a liquid sensor, or upon a pendulum device responsive to downward gravitational orientation. However, the mass of a pendulum renders such devices also responsive to acceleration, and hence are not useful as attitude sensors in dynamic systems involving an accelerating body. Similarly, liquid sensors exhibit mass that affects attitude detection during acceleration, and also such sensors are vulnerable to vibration that affects surface characteristics of the liquid upon which sensing may depend.

Vertically-oriented spinning gyroscopes commonly operate as attitude sensors, but are usually heavy, bulky, expensive devices that are subject to precession and drift errors. They also suffer from poor reliability in rugged operating environments due to the moving parts that make up the technology which require periodic maintenance to keep the units operational.

Other known attitude sensors rely upon multiple GPS receivers at spaced locations to compute attitude from signals received at each location. However, such computation of attitude is subject to the distance inaccuracy of signals received at each location, and the spacing of the locations should be very much larger than the distance error associated with each such location, and this contributes to unacceptably large systems for making fine attitude measurements. Rate sensors of negligible mass such as ring laser gyroscopes have been used in attitude-sensing measurements, but are vulnerable to drift and associated long-term instability.

SUMMARY OF THE INVENTION

In accordance with the present invention, accurate attitude sensing is accomplished by measuring acceleration in three orthogonal axes and measuring angular rate about each such axis to compute attitude accurately relative to a vertical axis. Solid-state accelerometers and rate sensors are temperature compensated and are assembled into a small common housing for applications in rugged environments. Measurement errors attributable to fabrication misalignments, and the like, are calibrated out following initial assembly for highly reliable and accurate outputs from a compact, rugged assembly of components. Vibrating ceramic plates operate as rate sensors responsive to Coriolis forces to produce angular rate outputs independently of acceleration, and micromachined silicon devices operating as differential capacitors to sense acceleration in aligned directions independently of angular rate about the orthogonal axes.

A method in accordance with the present invention includes converting analog outputs of all sensors to digital values with stored calibration correction values. The signals representing total angular rate or rotational velocity about each of the orthogonal axes is integrated into a quaternion (i.e., a 4-element vector that completely describes the orientation of an object), and total angular rate is computed from the sensed and corrected rates. The direction cosines are computed from the quaternion, and the accelerations of the assembly are computed from the three acceleration signals multiplied by the direction cosines. Attitude and other parameters or orientation and motion of the assembly are derived from the data produced by the accelerometers and rate sensors within the common assembly.

In one embodiment of the present invention, a relatively inexpensive and compact-sized system generates an accurate representation of an attitude of an object. In particular, the system measures attitude for an object that may be accelerating, thereby overcoming the drawbacks of conventional attitude measuring devices mentioned above. Furthermore, such embodiment of the present invention provides a self-tuning system that automatically compensates for drift and that automatically updates the quaternion obtained from sensor outputs. The system generates highly accurate output data based upon measurements obtained from commercially available, low or mid-level performance sensors. In addition, the user of the system can provide input commands that can adjust the output data of the system in order to further compensate for factors in the environment of the system. This embodiment of the present invention also reduces the manufacturing complexity of attitude measurement devices by providing a calibration sequence that reduces the number of testing steps during the manufacturing process.

In another embodiment of the present invention, improved algorithms for attitude and heading calculations are based upon extended Kalman filter trajectory corrections, with accelerometers providing attitude reference information, and the Kalman filter providing corrections to the attitude trajectory as calculated from integration of rate sensor information. Extended Kalman filter algorithm involves intense calculations performed by a dedicated processor. A master processor calculates the attitude trajectory, and a dedicated or slave processor calculates the Kalman filter corrections and estimates of sensor bias. Resultant attitude errors are less than 0.1 degree under static conditions, and are a function of the dynamic acceleration profile under dynamic conditions. Typical results obtained under flight test conditions analogous to light-aerobatic maneuvers indicated only about 1–2 degrees RMS attitude errors.

DETAILED DESCRIPTION OF THE INVENTION

Figure 1:
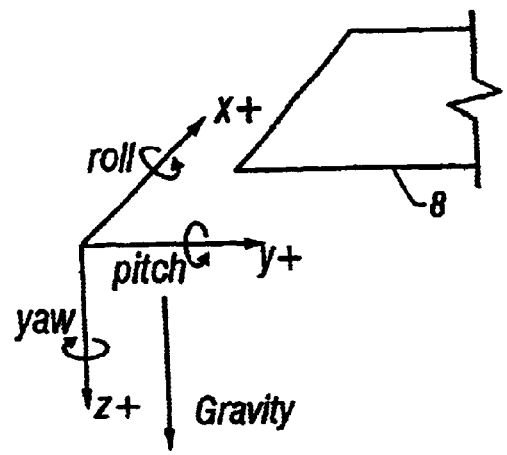
FIG. 1 is a graph illustrating coordinate axes with respect to which the present invention responds to movements and orientations.

Referring now to the graph of FIG. 1, there is shown a coordinate set of axes X, Y, and Z that designate directions of movement or orientations with respect to the 'horizon' 8 as a reference plane, and about which rotational motions are specifically legend as 'pitch' (i.e., rotation about Y in the XZ plane), and 'roll' (i.e., rotation about X in the YZ plane), and 'yaw' (i.e., rotation about Z in the X Y plane, also referenced as 'heading' or 'azimuth').

Figure 2:
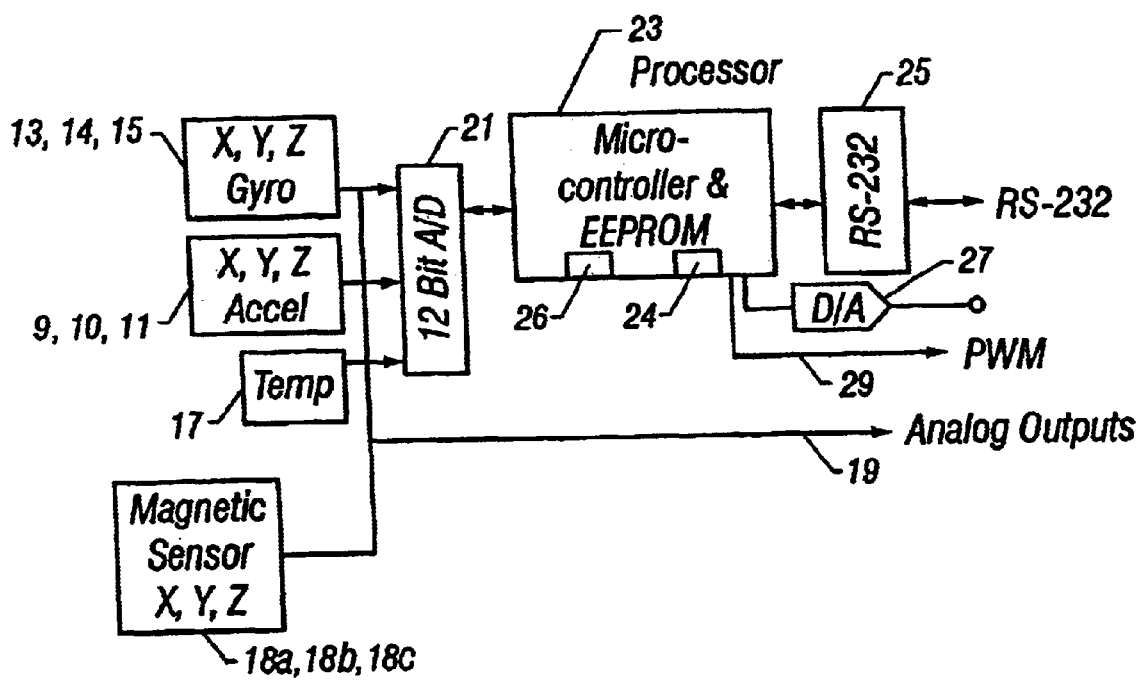
FIG. 2 is a block schematic diagram of one embodiment of the present invention.

In accordance with the present invention, as illustrated in the block diagram of FIG. 2, solid-state accelerometers 9, 10, 11 are disposed in alignment with each of the X, Y, and Z axes, respectively, and inertial elements 13, 14, 15 are disposed to sense rate of change of angular displacement about each of the X, Y, and Z axes, respectively. The accelerometers 9–11 may each comprise conventional micro-machined silicon devices that operate on differential capacitance to produce an analog output indication of axial acceleration. Suitable devices are commercially available as Model No. ADXLO5 from Analog Devices, Inc. of Norwood, Mass. Similarly, the inertial elements 13–15 are solid-state devices that each comprises a vibrating ceramic plate responsive to Coriolis force to produce an analog output indication of angular rate independent of acceleration. Suitable devices are commercially available as Model No. ENV-05H-2 from Murata Manufacturing Co., Ltd. in Japan. The accelerometers and rate sensors and a temperature sensor 17 may be assembled within a confining housing of about 3 cubic inches, or less, for unobtrusive installation in numerous applications. Optional magnetic sensors 18a–18c may be aligned with each of the X, Y, and Z axes in order to provide correction factors for heading (yaw), as described below. The analog outputs from the accelerometers 9–11, and from the inertial elements 13–15, and from the temperature-sensing element 17, and from magnetic sensors 18a–18c, are supplied as outputs 19 of the assembly, and are also supplied to an on-board Analog-to-Digital (A/D) converter 21 for conversion in time-share mode to digital data with a minimum 12-bit accuracy with respect to the applied analog input signals. The digitized data is supplied to an on-board processor 23 having Electrically Erasable Programmable Read-Only Memory (EEPROM) 24 with storage locations therein for storing the calibration data for the sensors, as later described-herein. The processor 23 also includes a frequency compensation network 26 for further manipulating the sensor outputs, as described below. One suitable processor 23 is the DSP processor Model TMS 320C50 available from Texas Instruments, Inc. of Dallas, Tex.

The on-board processor 23 may be controlled to perform various calibration and operational routines via the conventional RS-232 controller port 25. The processor 23 may supply output data via a Digital-to-Analog (D/A) converter 27 for analog outputs per sensor in time-shared mode, or may provide output data per sensor as pulse-width modulated (PWM) output signal 29 in time-shared mode.

Figure 3:
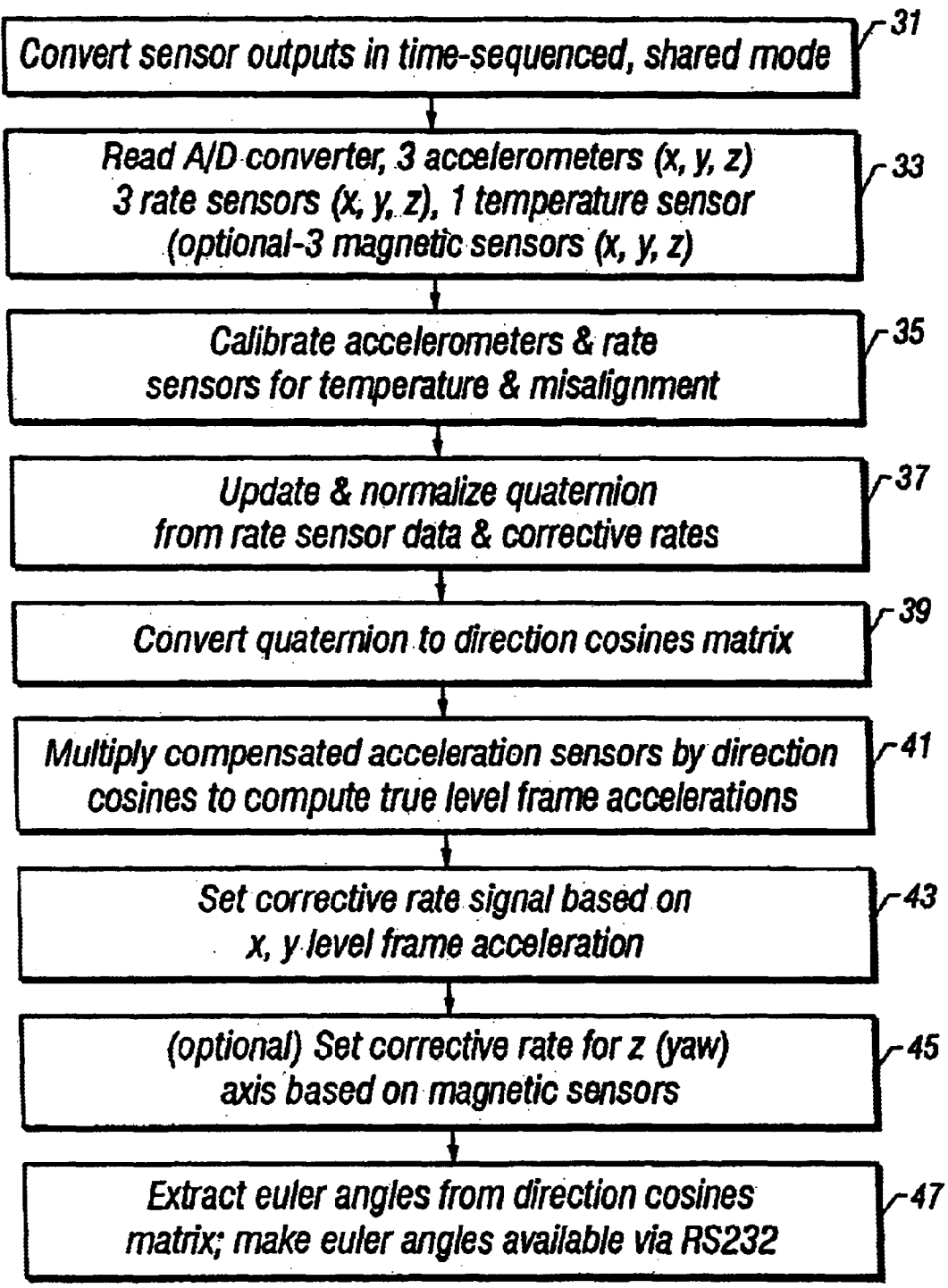
FIG. 3 is a flow chart of an operational sequence according to the present invention.
Figure 6:
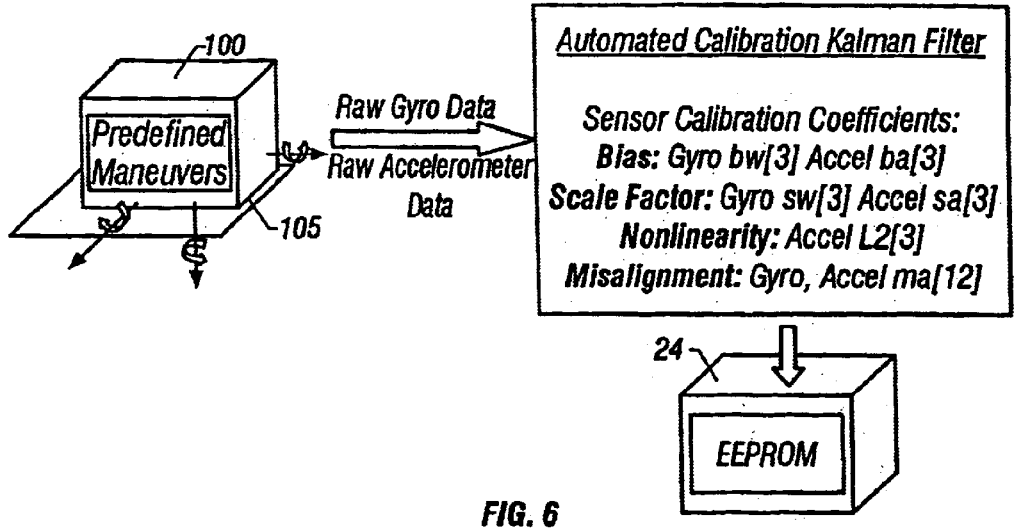
FIG. 6 is a flowchart describing a method for determining the calibration coefficients and correction factors thereby providing a "factory calibration" used in accordance with the present invention.

As illustrated in the flow chart of FIG. 3, data from all of the sensors 9–11, 13–15, and 17 (and 18a–18c, optionally) (FIG. 2) in one processing cycle are converted 31 in time-sequenced, shared mode by A/D converter 21 for storage in selected memory locations of the EEPROM 24. This digital data is converted 33 by the processor 23 to the sensed variables of accelerations and angular rates of the sensors within the assembly relative to the respective X, Y, and Z axes. This step is done using the calibration data stored in the EEPROM via application of the Sensor Compensation formulas, as set forth in Appendix A. Appendix A to Appendix G are provided below. A method of determining the proper calibration data (coefficients) in the Sensor Compensation formulas is described in detail below with reference to FIG. 6. An implementing program in 'C' or assembly language may be prepared in conventional manner to control a processor 23 that can execute solutions to the Sensor Compensation formulas at 100 $H_z$ or faster rates. A DSP processor Model TMS320C206 available from Texas Instruments and operating on program code written in 'C' is suitable for the purpose. As stated above, optional magnetic sensors aligned with each of the X, Y, and Z axes may also be used to stabilize heading or yaw in addition to roll and pitch. The acceleration and rate sensors may then be calibrated 35 using calculations of the calibration coefficients, as detailed later herein. FIG. 6 below illustrates a method of performing the initial or "factory" calibration for the attitude measurement, sensor in accordance with the present invention.

The angular rate signals are then integrated into a quaternion representation of attitude. The quaternion update formulas, and normalization of the quaternion, detailed in Appendix C, are further discussed below with reference to FIG. 7. The quaternion update 37 is the preferred method of attitude update because of the simplicity of the formulas and the small number (four) of variables that must be computed. Note that the integration is a function of not only the sensed angular rate but also the corrective angular rate-as defined by ωcx, ωcy, ωcz. The generation of the corrective angular rate terms are described below in the text that follows. The incorporation of corrective angular rates prevents long term drift and instability that would be caused by the use of rate sensors alone. After the quaternion is computed, it is normalized to have a magnitude of one (1).

Once the quaternion has been updated to reflect the instantaneous orientation of the platform or object, the quaternion is converted 39 to a Direction Cosine Matrix in preparation for computing the corrective rate signals ωcx, ωcy, ωcz. The formulas for the Direction Cosine Matrix are set forth in Appendix D. A Direction Cosine Matrix (like the quaternion) also completely characterizes the attitude orientation of a body. The Direction Cosine Matrix, also referred to as a rotation matrix, is in fact a representation of the three rotations about the defined three axis (X,Y, and Z) needed to rotate a body from a level orientation (relative to gravity), to the final orientation desired. Hence the relationships in Appendix D describe how the elements of the quaternion, which also describes such orientation, can be converted to the nine terms needed to define the Direction Cosine Matrix. The variables in Appendix D then include the definition of the Direction Cosine Matrix itself in the form of a 3 by 3 matrix (nine terms) dc[3][3], and the conversion of the four quaternion elements a, b, c and d into the Direction Cosine Matrix.

The Direction Cosine matrix is used to convert the acceleration vector of the platform or object into level frame readings that indicate 41 the true acceleration of the platform without tilt, as set forth in Appendix B. If, while the unit is sitting statically, there is a sensed level frame acceleration, one of two things has occurred. The solution for the attitude of the platform or object has drifted due to rate sensor drift, or the platform is moving linearly and accelerating in level frame coordinates.

Figure 5A:
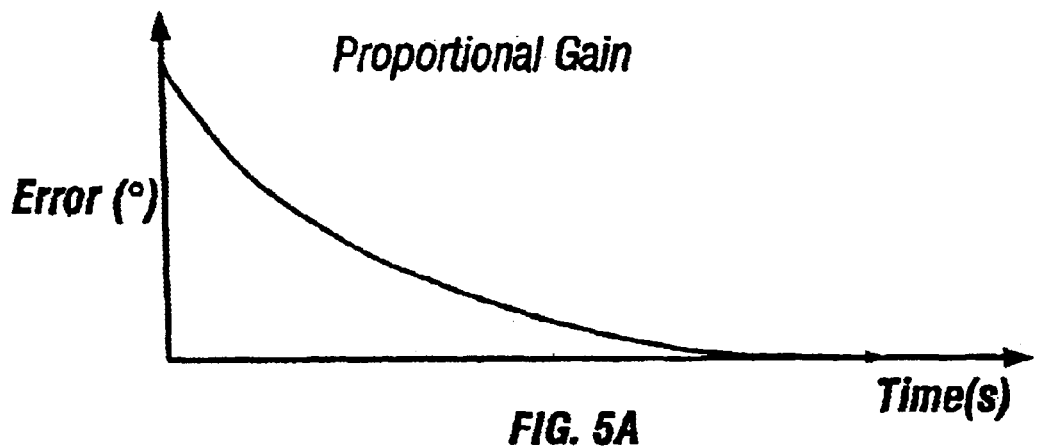
FIG. 5A is a graph illustrating error correction over time under proportional gain control.
Figure 5B:
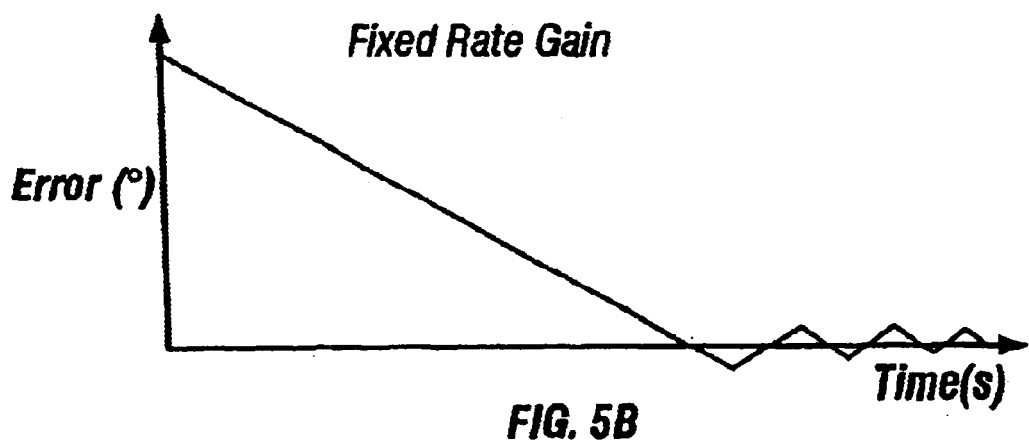
FIG. 5B is a graph illustrating error correction over time under fixed rate gain control according to the present invention.

The level frame accelerations are used to generate a corrective rate signal 43. There are several different methods of generating corrective rate signals, including Kalman or other conventional adaptive filtering, fixed gain scheduling, or non-linear gain scheduling. The Kalman filter/adaptive approach is optimal but involves extreme complexity (and leads to a relatively larger-sized and more expensive device). The proportional gain scheduling and non-linear gain (fixed-rate gain) scheduling are efficient and accurate enough for most scenarios, as detailed in Appendix E. For a setting of proportional gain, the corrective rate signals ωcx is obtained by multiplication of the level frame acceleration variable; alev[2] (obtained during factory calibration) with the variable KG. The KG value can be considered a gain representing the magnitude of the correction, is user selectable and is described below. For a setting of non-linear, or fixed-rate gain, the corrective rate signal ωcx is obtained by multiplication of the factor (−1) with the variable UG for alev[2]>0.0. The UG value can be considered a gain representing the magnitude of the fixed-rate correction, is also user selectable and is described below. Additionally, FIG. 5A shows the plot of error correction for proportional gain schedule and FIG. 5B shows the plot of error correction for non-linear gain schedule.

As a further option, the gain amount for the correction factors may also be adjusted by the user of the system of the present invention. This option permits the user to modify the system output for various reasons such as factors in the environment of the system, noise limitations, stability criteria, and the like. An example for making gain correction user selectable is to allow for the possibility of providing useful data during a rapidly maneuvering mission. There is a tradeoff between how much error in the gyros the algorithm can overcome with a low gain correction, compared to the errors induced from having a high gain correction while experiencing large maneuvering accelerations. If the user has knowledge of the intensity of upcoming maneuvers-or complete control of the flight profile, then an adapted gain correction scheme can be developed by minimizing the gain correction during the high acceleration portions, and increasing the gain correction when not accelerating.

As further shown in FIG. 3, a corrective rate for the Z (yaw) axis acceleration may be generated 45 based upon the measurements of the magnetic sensors 18a–18c, as shown in FIG. 2. Regarding gyroscopic errors attributable to heading or directional deviations, a GPS receiver can be used to measure heading of a platform that is moving and that supports the assembly of sensors 9–11, 13–15, and 17. Another way to measure heading is to use magnetic sensors to measure Earth's magnetic field in the same assembly of the rate sensors and accelerometers. The heading thus measured can optionally be used to stabilize the yaw axis from drift. This capability yields a directional gyro measurement without any additional cost. The formulas for stabilizing heading are detailed in Appendix F.

Although the attitude solution is computed and stored internally as a quaternion and direction cosines matrix, it is most conveniently transmitted in Euler Angle format which is chosen because of its small size (3 variables versus 4 for quaternion and 9 for direction cosines matrix) and because it is interpreted as a 'real' angle about an axis. The Euler Angles are extracted 47 from the direction cosines matrix, as detailed in Appendix G, and are supplied via the interface 25 to the RS 232 bus.

Thereafter, temperature corrections, and other corrections, can be digitally incorporated into the output data using correction values derived and stored in look-up tables in conventional manner. Specifically, for temperature calibration, the entire assembly may be operated at selected elevated temperatures to store acceleration and angular rate data at storage locations indexed by temperature values, and such data with associated corrections for temperature may thereafter be accessed from storage locations identified by the sensed operating temperature.

Similarly, look-up table corrections may also be prepared for operation in particular applications such as conventional camera stabilization platforms in which directional misalignments and non-linearities may be prepared in a look-up table indexed, for example, by angular orientations.

One-time factory calibration of the entire assembly of accelerometers and angular rate sensors and temperature sensor is typically required to correct for non-linearities of response, misalignments relative to the coordinate axes, and the like. Specifically, conventional accelerometers commonly produce an output linearly proportional to the input acceleration, with an offset value. Thus:

$$\text{Voltage out} = \text{Scale Factor} * \text{Acceleration} + \text{Offset} \quad \text{(Eq. 1)}$$

For calibration, known accelerations are applied in axial alignment in order to compute the scale factor and the offset from the resulting output voltages. Gravity along the Z axis provides a convenient reference, but since minor variations occur in gravity, it is important to determine gravity at the site of the calibration, and this can be accomplished very precisely by referencing standard formulas and handbooks that contain the exact gravitational constant for every longitude and latitude on Earth. A level surface on X-Y plane provides a convenient reference of zero (0) acceleration, thereby allowing determination of the offset voltage (also known as "bias").

Similarly, conventional angular rate sensors commonly produce an output voltage that is linearly proportional to the input angular rate, plus an offset. Thus:

$$\text{Voltage out} = \text{Scale Factor} * \text{Angular Rate} + \text{Offset} \quad \text{(Eq. 2)}$$

To calibrate such angular rate sensor, the sensor offset may be measured, as an output voltage while the sensor is not moving (neglecting Earth's rotation as not significantly affecting the offset results). However, measuring scale factor traditionally requires an elaborate rotational table to subject the assembly to fixed angular rate for producing a resultant output voltage. Alternatively, in accordance with the present invention, from Equation 2, above:

$$V_{out} - \text{Offset} = \text{Scale Factor} * \text{Rate} \quad (Eq. 3)$$

$$\int (V_{out} - \text{Offset})\, dt = \text{Scale Factor} * \int (\text{Rate})\, dt \quad (Eq. 4)$$

$$\int (V_{out} - \text{Offset})\, dt = \text{Scale Factor} * \text{Angle} \quad (Eq. 5)$$

Equations 3 and 4 above describe algebraic and linear mathematical operations on Equation 2, namely the subtracting of both sides of Equation 2 by the offset, and then performing the integration operator on both sides of Equation 4. Equation 5 then defines the notion that the integral of the angular rate is in fact the angle. Since all variables of Equation 5 are determined except for scale factor, this parameter of a sensor can therefore be conveniently determined and used in the processing to solve for angular rate, given a sensor voltage, as detailed in Appendix A.

Regarding accelerometer alignment errors, these errors represent cross coupling between the axes of sensitivity attributable to misalignment of an accelerometer with the associated coordinate axis of responsiveness. Of course, if each accelerometer can be precisely aligned with its associated coordinate axis, then misalignment error is eliminated. However, machining tolerances and fabrication anomalies contribute to unpredictable misalignment errors, and accordingly, cross axis calibration following assembly is employed to improve accuracy of acceleration responses. Specifically, the assembly of sensors is placed on each of its three axes and an output is recorded. The value of the output is subtracted from the true input acceleration which will be zero on two axes and 1G on the axis exposed to gravitational field. The resulting data is organized into a matrix of 9 elements. This matrix is inverted in conventional manner and the result is a compensation matrix which converts measurements that have cross-axis sensitivities to true accelerations.

FIG. 6 illustrates a method of obtaining and setting the correction factors described above. The procedure for obtaining the correction factors will hereafter be referred to as "the calibration procedure." The calibration procedure is designed to adaptively estimate the correction factors for the six sensors in question. Optional magnetometer calibration is generated by taking measurements in a Helmhotz Coil. Calibrating a complicated six axis system is a difficult prospect when considering the amount of errors that are inherently part of the measurement technology employed by the accelerometers and gyros. The difficulty lies in the fact that to estimate the error factors in any calibration technique requires understanding the underlying properties of each error to generate data that reflects the error specifically, and seldom are the errors uncoupled enough to isolate each separate error source with much confidence.

The procedure developed provides a technique which estimates all the error parameters at once from a single set of data, and generates the proper compensation for each error source. The technique employs an adaptive filtering scheme, a Kalman Filter, which processes a set of accelerometer and gyro readings from a predefined set of maneuvers. In essence, the calibration involves obtaining data from the sensors as the system 100 is placed on a leveled table 105, rotated about each axis and laid down on each face of the cube enclosing the system 100, and then processing the data with the Kalman Filter software which generates the compensation tables. As a final step the calibration compensation parameters are loaded into the EEPROM 24, from which the DSP 23 of FIG. 2 is able to obtain the parameters to apply the compensation to the raw accelerometer and gyro measurements to achieve calibrated data. The Kalman filter is a tried and true method of using a computer processor to estimate a set of parameters from a set of measurement data. The measurement data can be a direct measurement of the parameter, also known as a state, or a measurement of a signal that in some way has a mathematical relationship to the state the filter is trying to estimate. Such filter structure is made up of two separate components including a state model and a measurement model. The state model is a detailed mathematical representation of the states, which is used to simulate their behavior and obtain a prediction of what values the states will have at some time in the future. The measurement model derives a correction to the predicted state based on the measurement data, and it is this corrected prediction of the state that is referred to as the final state estimate. In the calibration procedure Kalman Filter, the states that are estimated are the sensor correction factors or calibration parameters. A complex mathematical model of the behavior of the parameters and their interdependence makes up the state model. It uses the accelerometer and gyro data from the maneuvers to help in the prediction of the behavior of the parameters. The filter then infers from the maneuvers themselves information that it uses as a measurement of the parameters. For instance, the filter can determine when it has arrived at a stationary point in a maneuver, and therefore assumes that accelerometers should measure zero with one axis along the gravity axis, and that the gyros should also measure zero. This information is processed by the measurement model, which deems any gyro data or gravity axis offset at this point as a measurement of the parameters, and forms a correction for the predicted parameters from the state model. A list of the parameters currently estimated by the filter is represented in the Table 1 below. Each parameter is weighted for its impact on the overall performance of the filter. The marks shown below depict those parameters deemed important for the represented sensor.

TABLE 1

| | Gyros or Rate Sensors | Accelerometers |
|---|---|---|
| Bias | X | X |
| Scale Factor | X | X |
| Squared Non-Linearity | | X |
| Misalignment | X | X |

A Kalman filter algorithm for navigating the DMU in a local level frame during calibration is described above. More specifically, the compensation parameters can be determined using a calibration procedure designed to adaptively estimate the calibration parameters. Calibrating a complicated sensor like the DMU is a difficult prospect when considering the errors that are inherently part of the measurement technology employed by the accelerometers and rate sensors. Traditional methods of calibration involve generating enough data from rate and vibration tables and then using curve-fitting techniques to determine the correct compensation. The difficulty lies in the fact that to estimate the error factors in any calibration technique requires understanding the underlying properties of each error to generate data that reflects the error specifically, and seldom are the errors uncoupled enough to isolate each separate error source with much confidence.

Thus, utilizing an adaptive calibration technique based on a Kalman filter involves generating data from the DMU as it is placed on a leveled table, rotated about each axis and laid down on each face of the cube-shaped DMU package 100, as illustrated in FIG. 6, and then processing the data with the Kalman filter software to generate the compensation tables. As a final step the calibration compensation parameters are coded into the DMU's onboard processor and memory for application as compensation to the raw accelerometer and rate sensor measurements to achieve calibrated data.

In the Kalman filter that is applied during calibration, the states that are estimated are the calibration parameters and the reference measurements are the accelerometer and rate sensor data from the maneuvers and from known static positions of the packaged DMU 100 on the leveled table 105. The filter then infers from the maneuvers the information that it uses as a measurement of the parameters. For instance, the filter can determine when it has arrived at a stationary point in a maneuver, and therefore assumes that accelerometers should measure zero, except for the measure of 1 along the gravity axis, and that the rate sensors should also measure zero. This information is processed by the measurement model, which regards any variations from these conditions in the rate sensor data or gravity axis at this point as a measurement of the offset or bias parameters, and forms a correction for the predicted parameters from the state model. A list of the parameters estimated by the filter is represented in Table 1, above. Each parameter may be weighted for its impact on the overall performance of the filter. The marks shown in Table 1 depict those parameters deemed important for the represented sensor.

Figure 7:
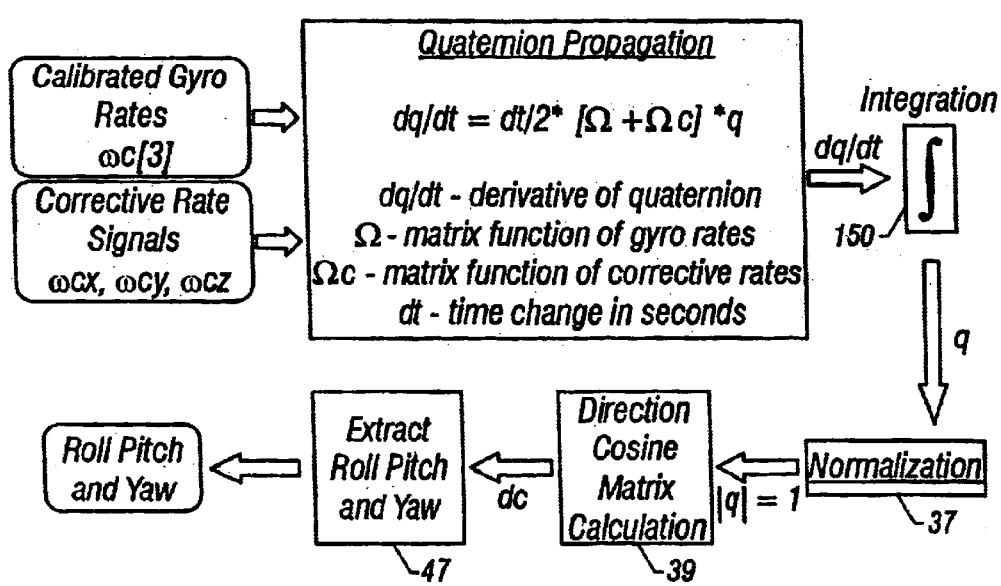
FIG. 7 is a flowchart illustrating additional details of the quaternion update and normalization.

FIG. 7 illustrates a method of updating and normalizing a quaternion that is obtained from the sensor outputs. Appendix C defines the update and normalization procedures for the quaternions. The update portion is in fact a propagation of the quaternion vector as it propagates in time. In order to characterize how the quaternion changes in time, an equation is created which explicitly defines the time dependency of the quaternion (or its derivative) and this equation is referred to as a differential equation. The propagation is then obtained by calculating the solution to the differential equation. In order to solve the differential equation we need to integrate 150 the equation which then removes the time dependence of the derivative of the quaternion, and allows us to obtain the value of the quaternion at any time. In order to maintain complete stability of the calculation, one of the properties of the quaternion that must be maintained is that the magnitude (the square root of the sum of the squares) of the quaternion vector must always equal one (1). This is achieved by normalizing 37 the quaternions. The variables in Appendix C describe both the updating and normalization process. The quaternion is represented by a, b, c and d, and the angular rate vector (calibrated gyro measurements) is represented by $\omega c[3]$. The four temporary terms a4, b4, c4 and d4 represent the derivative of the quaternion, and the four equations for these terms represent the differential equation for the quaternion vector. Notice the dependence of the derivative (time rate of change) of the quaternion on the angular rate terms which really represent the rate of change of the rotation about each axis X,Y and Z. Also notice that the corrective angular rates $\omega cx$, $\omega cy$ and $\omega cz$ are also present in the differential equation. This is in effect how the angular rate terms obtained from the gyros are corrected. The update quaternion section and the four equations using the quaternion terms define the integration of the differential equation process. The time dependency on the derivative of the quaternion is solved for, and therefore the quaternion vector itself is calculated. The final section then normalizes the calculated quaternion thereby assuring that the magnitude of the quaternion will always be one (1).

Figure 4A:
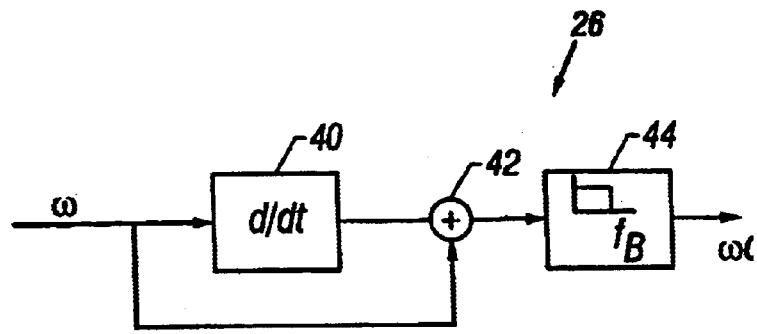
FIG. 4A is a schematic diagram of one embodiment of the present invention for enhancing bandwidth.
Figure 4B:
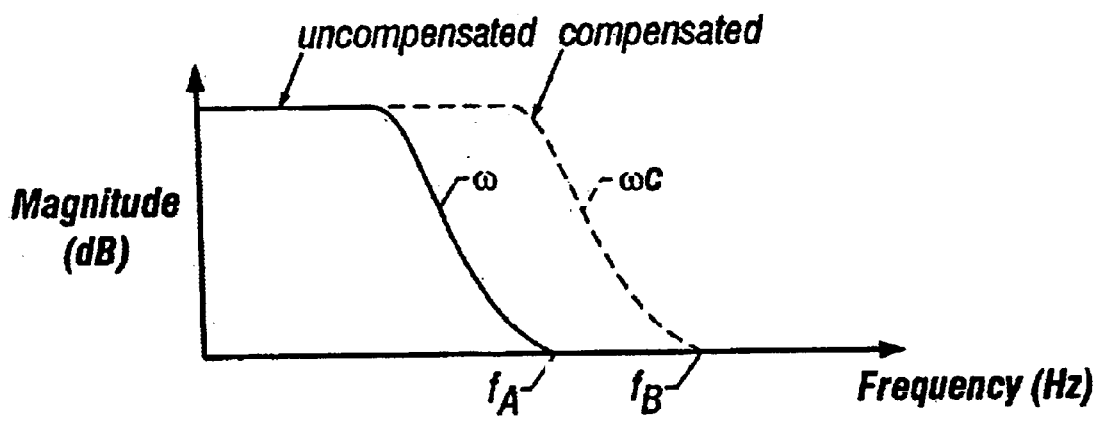
FIG. 4B is a graph showing bandwidth compensation according to the present invention.

Reference is now made to FIGS. 4A and 4B in order to discuss a further compensation process that may be provided by the system in accordance with the present invention. The bandwidth of conventional sensors is commonly too narrow (e.g. about 10 $H_z$) for many applications requiring quick stabilization to produce accurate output data rapidly. In such applications, a frequency-compensating network 26, as shown in FIG. 4A in either digital or analog form, may be introduced into the circuit to operate on sensor output signals, and may include a differentiator 40 and summing junction 42 followed by a low pass filter 44. Specifically, the angular rate signal, $\omega$, is applied to differentiator 40 and to summing network 42 which is also connected to receive the output of the differentiator 40. A low-pass filter 44 having a bandwidth to about 100 $H_z$ receives the combined angular rate signal, $\omega$, and the differentiated angular rate signal at the output of summing network 42 to provide the compensated angular rate signal, $\omega c$, having higher frequency components and wider bandwidth, as shown in FIG. 4b, than the initial angular rate signal.

Thus, the frequency compensation stage performs frequency compensation to the gyros and accelerometers which can provide enhanced dynamic response of, reduce the noise in, and reduce the sensitivity to vibration of the quaternion update. In other words, performing frequency compensation is performed to the gyro sensor data which expand the operational bandwidth of the gyros to provide updates to the quaternion under dynamic conditions which the gyro sensor alone would not be able to track, or which compress (filter) the gyro and accelerometer bandwidth to reduce noise and to reduce vibration sensitivity in the quaternion calculation.

As a further option, the user may turn off the low-pass filter 44 so that the above filter compensation technique is not performed.

Figure 8:
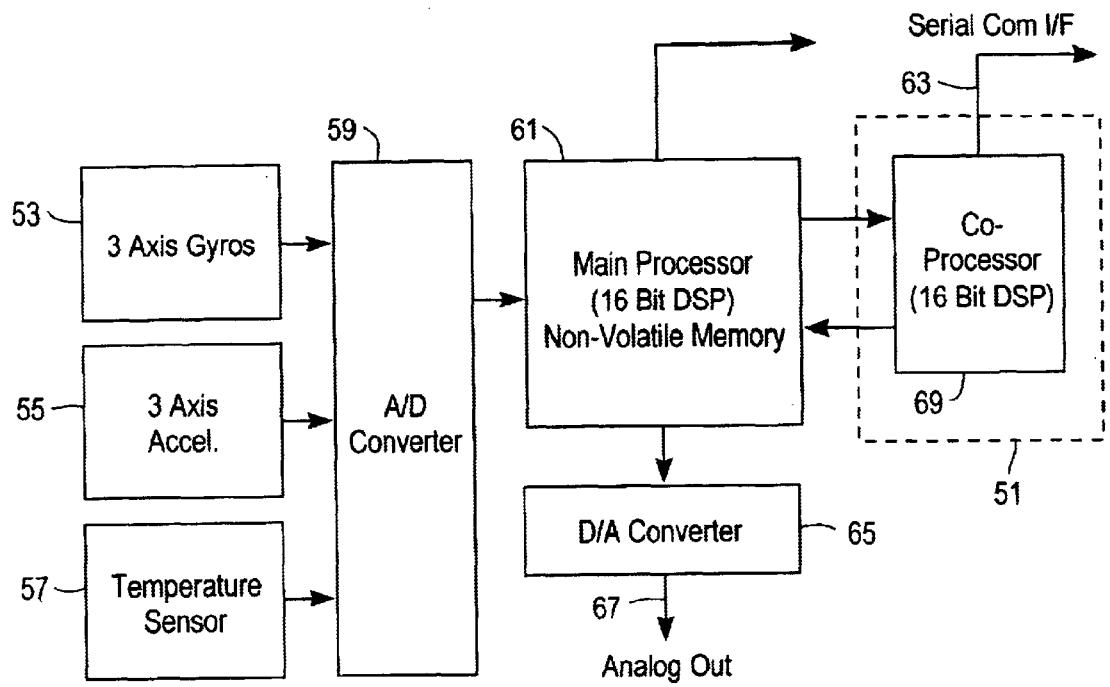
FIG. 8 is a schematic diagram of a system including co-processors for computing attitude trajectory and Kalman filter corrections.

Referring now to the block schematic diagram of FIG. 8, an additional slave co-processor 51 is included in the system to perform the Kalman filtering computation. As in the embodiment previously described with reference to FIG. 2, data acquisition components include three-axes gyros 53 and three-axes accelerometers 55, and optionally magnetic or compass or other heading references (not shown), together with temperature monitor 57 and an A/D converter 59 under control of the main or master processor 61 that includes non-volatile memory for storing calibration error correction data for the data acquisition components, all in a manner as previously described herein. The main processor 61 performs the attitude computation, as previously described herein, and also performs system control monitoring. The computed data or raw sensor data in digital form may be accessed through a serial communication bus (e.g., RS232) 53, as previously described herein, or may be accessed in analog form with error compensation included via a D/A converter 65 in the analog output channel 67.

Figure 9:
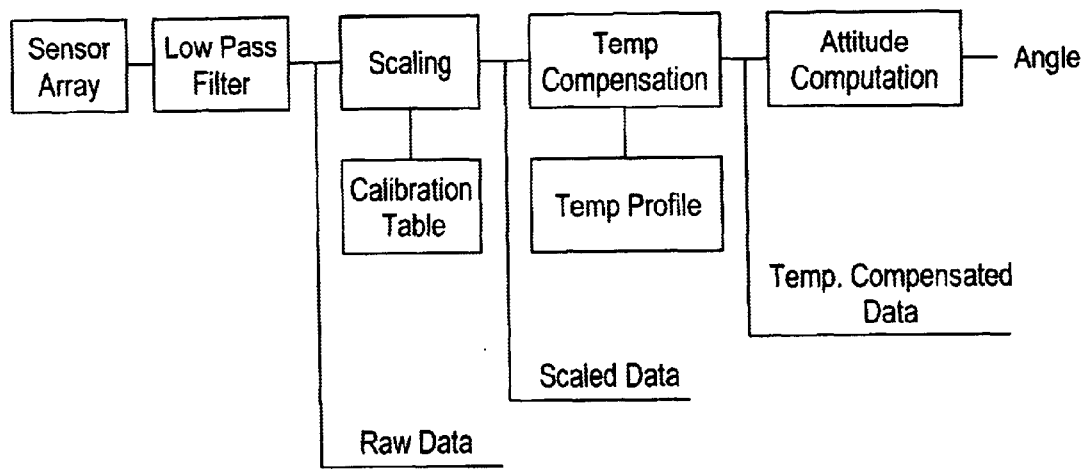
FIG. 9 is a block schematic diagram of progressive stages of compensation of data suitable for extended Kalman filter processing.

In order to run the Kalman filter efficiently, a second or slave co-processor 69 is closely coupled to the main processor 61 and is used to optimally implement the necessary algorithms, as described in the enhanced implementation data herein. As illustrated in FIG. 9, and as previously described herein, data in the process flows from sensor array through a compensation stage, and then an attitude computation stage.

At each point in the process, the sensor outputs are processed to produce optimum performance depending upon the application and temperature and other environmental conditions. The optimizing parameters are determined during manufacturing and calibration and are permanently stored in an EEPROM, as previously described herein.

In accordance with this embodiment of the present invention, the attitude determination algorithm is divided into two separate entities. Information about angular rate as measured by rate sensors is integrated in time in an attitude processor routine. If the initial attitude of the vehicle was known exactly and if the rate sensors provided perfect readings then the attitude processing would suffice. However, the initial attitude is seldom known, and rate sensors typically provide corrupted data due to bias drift and turn-on instability. Without an adaptive filter structure such as a Kalman filter and separate independent measurements, the computed navigation results would diverge off the true trajectory. The Kalman filter attitude-correction routine therefore provides an on-the-fly calibration by providing corrective signals (referred to as correction quaternion terms) to the computed attitude processor quaternion and a characterization of the rate sensor bias state, with the accelerometers providing an attitude reference from gravity.

Figure 10:
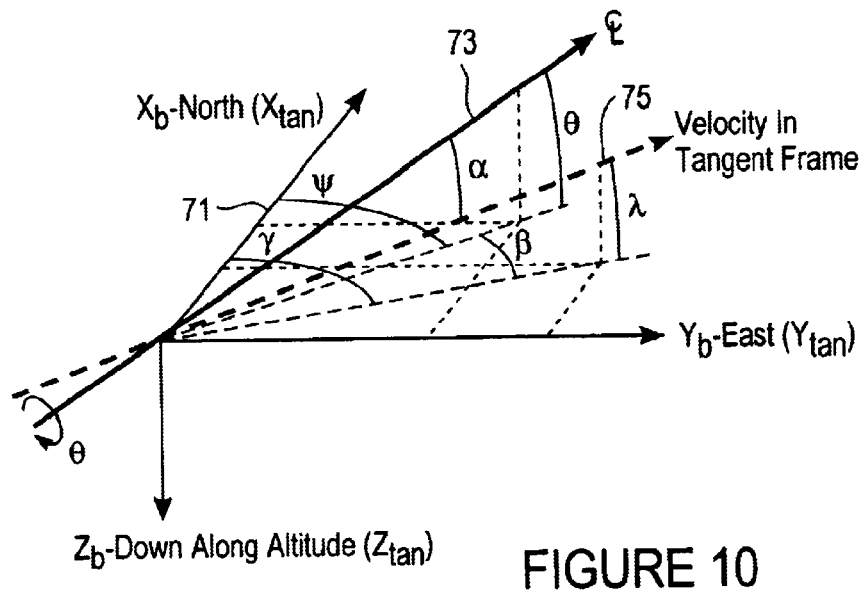
FIG. 10 is a graph showing the vectors involved in calculating attitude error corrections associated with the body frame of a vehicle in relation to a tangent frame or local level horizontal frame.

Referring now to FIG. 10, the reference plane described above with respect to FIG. 1 may be considered as a coordinate frame for the attitude measurement. The body axis of a vehicle such as an aircraft is defined as the coordinate frame with positive x through the vehicle nose, positive y through the right wing, and positive z down to complete the right-handed orientation of three axes. Its origin is nominally located at the vehicle center of gravity (CG). In FIG. 10, the body frame of the vehicle is shown relative to the tangent frame or local level horizontal frame. In this construct, the body axis 71 is chosen to point toward north along its x-axis when there is no yaw angle. Therefore when the vehicle attitude is zero, or that the Euler angles of roll, pitch, and yaw are zero, the transformation from body frame to tangent frame is simply:

$$CB2T = \begin{bmatrix} 1 & 0 & 0 \\ 0 & 1 & 0 \\ 0 & 0 & 1 \end{bmatrix} \quad \text{(Eq. 6)}$$

Here the matrix represents the "Cosine rotation matrix which converts from Body (2) to Tangent frame". The term tangent frame can be used interchangeably, with the term level frame as used in the previous description. This serves as the starting point for further rotation of the body in the tangent frame due to changes in vehicle attitude. Several angles defined in the FIG. 10 are of importance for the vehicle. The centerline of the vehicle 73 is shown displaced from the vehicle's velocity vector 75 in the tangent frame. The angles which the velocity vector 75 makes with respect to the vehicle centerline 73, are the typical aerodynamic control angles, including angle of attack: $\alpha$, and angle of sideslip $\beta$. The angles that the velocity vector makes with respect to the tangential plane are the typical air velocity angles including flight path angle $\lambda$ and heading angle $\gamma$. The Euler body angles, which the centerline of the vehicle body 73 makes with respect to the tangential frame are the pitch $\theta$ and yaw $\psi$ angles. The vehicle body roll angle $\phi$ is rotated along its centerline. The Euler angles describe the vehicle attitude and form a 3-2-1 rotation of the body in the tangent frame. In explicit terms the rotation matrix is:

$$CB2T = \begin{bmatrix} 1 & 0 & 0 \\ 0 & 1 & 0 \\ 0 & 0 & 1 \end{bmatrix} \begin{bmatrix} c\psi & -s\psi & 0 \\ s\psi & c\psi & 0 \\ 0 & 0 & 1 \end{bmatrix} \begin{bmatrix} c\theta & 0 & s\theta \\ 0 & 1 & 0 \\ -s\theta & 0 & c\theta \end{bmatrix} \begin{bmatrix} 1 & 0 & 0 \\ 0 & c\phi & -s\phi \\ 0 & s\phi & c\phi \end{bmatrix} \quad \text{(Eq. 7)}$$

$$CB2T = \begin{bmatrix} c\psi c\theta & -s\psi c\phi + c\psi s\theta s\phi & s\psi s\phi + c\psi s\theta c\phi \\ s\psi c\theta & c\psi c\phi + s\psi s\theta s\phi & c\psi s\phi + s\psi s\theta c\phi \\ -s\theta & c\theta s\phi & c\theta c\phi \end{bmatrix}$$

where c is abbreviation for cosine; and is abbreviation for sine. From this rotation matrix which will transform a vector from the body frame into the tangent frame, the attitude Euler angles can be derived as follows:

$$\phi_{(roll)} = \operatorname{atan}\left(\frac{CB2T(3,2)}{CB2T(3,3)}\right) \quad \text{(Eq. 8)}$$

$$\theta_{(pitch)} = -\operatorname{asin}(CB2T(3,1)).$$

$$\psi_{(yaw)} = \operatorname{atan}\left(\frac{CB2T(2,1)}{CB2T(1,1)}\right)$$

As previously described herein the attitude estimation algorithm processed provides stable Euler roll, pitch angles. These angles are determined by integrating the rate signals into a quaternion representation of attitude (or the CB2T matrix). The quaternion formulation for the transformation is repeated below. Following Euler's theorem, the quaternion is a representation of a rotation about an axis of rotation ($e_1$, $e_2$, and $e_3$) by an angle $\phi$. The components of the quaternion are:

$$\bar{q} = \begin{bmatrix} q_1 \\ q_2 \\ q_3 \end{bmatrix} = \begin{bmatrix} \sin(\frac{\varphi}{2})e_1 \\ \sin(\frac{\varphi}{2})e_2 \\ \sin(\frac{\varphi}{2})e_3 \end{bmatrix} \quad q = \begin{bmatrix} q_0 \\ \bar{q} \end{bmatrix} \quad \text{(Eq. 9)}$$

$$q_0 = \sqrt{1 - \bar{q}^T \bar{q}} = \cos\left(\frac{\varphi}{2}\right)$$

The quaternion vector component representing the axis of rotation is $\bar{q}$, and the quaternion scalar component $q_1$, represents the angle of rotation. The cosine rotation matrix is directly defined by the quaternion as:

$$CB2T = \begin{bmatrix} q_0^2 - q_1^2 + q_2^2 - q_3^2 & 2(q_1 q_2 - q_0 q_3) & 2(q_1 q_3 + q_0 q_2) \\ 2(q_1 q_2 + q_0 q_3) & q_0^2 - q_1^2 + q_2^2 - q_3^2 & 2(q_2 q_3 - q_0 q_1) \\ 2(q_1 q_3 - q_0 q_2) & 2(q_2 q_3 + q_0 q_1) & q_0^2 - q_1^2 - q_2^2 + q_3^2 \end{bmatrix} \quad \text{(Eq. 10)}$$

In this way, the quaternion that makes the transformation is:

$$QB2T = \begin{bmatrix} q_0 \\ q_1 \\ q_2 \\ q_3 \end{bmatrix} \quad \text{(Eq. 11)}$$

Finally the body attitude is calculated from the QB2T quaternion (body to tangent) by employing the derivative of the quaternion formulation described below:

$$\lambda = [QB2T] = \left[\frac{1}{2} * \Omega_{Bodyrate} * QB2T\right] \quad \text{(Eq. 12)}$$

The quaternion equation contains a matrix representation $\Omega$ of the angular rate of change of the coordinate frame in question. The matrix is made up of the angular rates about each coordinate-axis:

$$\Omega = \begin{bmatrix} 0 & -\omega_x & -\omega_y & -\omega_z \\ \omega_x & 0 & \omega_z & -\omega_y \\ \omega_y & -\omega_z & 0 & \omega_x \\ \omega_z & \omega_y & -\omega_x & 0 \end{bmatrix} \quad \text{(Eq. 13)}$$

$$\overline{\omega} = \begin{bmatrix} \omega_x \\ \omega_y \\ \omega_z \end{bmatrix} \begin{array}{l} \text{Angular rate about the } X\text{-axis} \\ \text{Angular rate about the } Y\text{-axis} \\ \text{Angular rate about the } Z\text{-axis} \end{array}$$

The solid-state gyros sense the body angular rates and the differential equation above is integrated to obtain the propagated quaternion QB2T. The relationships described above then provide the cosine rotation matrix from the quaternion and finally the attitude angles of roll, pitch and yaw from the cosine rotation matrix.

As previously described herein, a Kalman filter uses acceleration information, in particular the level (or tangent) frame acceleration information, to generate a corrective rate signal, thereby removing drift and improving accuracy of the attitude measurement. In another embodiment of the present invention, the attitude correction by the Kalman filtering achieves improved performance due to its ability to estimate the attitude errors and rate sensor bias (offset) states. In this embodiment, an absolute attitude error estimate is provided to the trajectory to correct any errors due to physical noise disturbances and rate sensor errors, as well as a characterization and "tracking" of the rate sensor biases which in effect provide an online rate sensor calibration. The filter model in this embodiment is an Extended Kalman Filter formulation made up of a linearized attitude error and rate sensor bias state model, and a nonlinear attitude quaternion error measurement model. The state model predicts where the attitude errors and rate sensor bias states will propagate based on input data from the rate sensors, and the measurement model corrects this prediction with the real world attitude error measurements obtained from the accelerometer gravity reference (also referred to as level frame acceleration), and from the leveled magnetometer heading reference. This balance of state modeling with real world parameters, gives the Kalman filter the adaptive intelligence to assign appropriate confidence levels on its two components.

In this embodiment, the Kalman filter is designed to correct the trajectory calculated by the attitude processor 61 and its state space is confined to estimating errors or perturbations in that attitude trajectory due to corrupt sensors. This is referred to as generating a trajectory perturbation state vector which includes attitude perturbations and sensor characterization that model the absolute error sources in the sensors, composed mainly of the rate sensor biases, or offsets.

The attitude perturbation is defined to be the error in the attitude processor knowledge of the body attitude with respect to the tangent frame. The filter state elements and their sizes are defined as follows:

$$\delta \hat{x}_{est} = \begin{bmatrix} \delta \overline{q} \\ \delta g_b \end{bmatrix} \begin{array}{c} 3 \times 1 \\ 3 \times 1 \end{array} \quad \text{(Eq. 14)}$$

There are three rate sensor bias estimates $\delta g_b$ for the rate sensors on each axis in the vehicle body frame. The attitude perturbation is modeled as a quaternion and is similar to Eq. 9. It defines the perturbation in vehicle attitude and is used to update the body-to-tangent frame cosine rotation matrix CB2T, thus providing a means to correct or "rotate" the current body frame to the latest estimate for the body frame.

$$\delta \overline{q} = \begin{bmatrix} \delta q_1 \\ \delta q_2 \\ \delta q_3 \end{bmatrix} \quad \text{(Eq. 15)}$$

$$\delta q_0 = \sqrt{1 - \delta \overline{q}^T \delta \overline{q}}$$

$$\delta q = \begin{bmatrix} \delta q_0 \\ \delta q_1 \\ \delta q_2 \\ \delta q_3 \end{bmatrix}$$

In presenting the state transition matrix below, the matrix cross product formulation is employed throughout. The definition of the notation is as follows:

$$\overline{u} \times \overline{v} = [\overline{u} \times] \overline{v} = \begin{bmatrix} 0 & -u_z & u_y \\ u_z & 0 & -u_x \\ -u_y & u_x & 0 \end{bmatrix} \begin{bmatrix} v_x \\ v_y \\ v_z \end{bmatrix} \quad \text{(Eq. 16)}$$

The attitude perturbation model contains most of the dynamical information, and therefore the attitude error reference which is obtained from the accelerometers and which provides a clear measure of the vehicle attitude in the tangent frame is significant. The rate sensor signals are used directly in the state transition matrix making it a time-varying process, as well as making it sensitive to the quality of the sensor signals. Very noisy rate sensor measurements should be pre-filtered, as previously discussed herein, before introducing them into the system, especially if that noise is electronic or high-frequency vibration disturbances above the bandwidth of the vehicle performance. The matrix is presented in the relationship below:

$$\delta \dot{\hat{x}}_{est} = A_{state} \delta x_{est} + Q \quad \text{(Eq. 17)}$$

$$\delta \dot{\hat{x}}_{est} = \begin{bmatrix} \delta \dot{\overline{q}} \\ \delta \dot{g}_b \end{bmatrix} = \begin{bmatrix} A_{qq} & A_{qe} \\ 0_{3 \times 3} & 0_{3 \times 3} \end{bmatrix} \begin{bmatrix} \delta \overline{q} \\ \delta g_b \end{bmatrix} + \begin{bmatrix} \omega_q \\ \omega_{g_b} \end{bmatrix}$$

From the perturbation state dynamics defined above, certain clear relationships are formed. The attitude perturbation $\delta \overline{q}$ dynamics are affected by errors due to coupled sensors in the rate sensor, with absolute errors in attitude that explain its dependency on the rate sensor measurements as well as the rate sensor bias terms. Each term is defined below:

$A_{qq} = Gyro_{Body} * \delta \overline{q}^T - \delta$
$\overline{q}^T * Gyro_{Body} - [(Gyro_{Body} + 0.5*(2*\delta \overline{q} \times Gyro_{Body} + *\delta g_b)) \times]$ $A_{qe} = 0.5 * I_3 - [\delta \overline{q} \times]$ \quad (Eq 18)

Using a quaternion formulation for attitude perturbations provides the advantage of using the higher order terms of the quaternion, and improved dynamic behavior of the quaternion. Perturbations in Euler angles, and its dynamic propagation is a very simple first order approximation that breaks down if the attitude errors grow large. The state process noise terms ω defined in the state dynamic equations (Eq. 17) are modeled as white noise for all the states. The noise covariance matrix for the state transition noise terms is labeled Q and is defined as a diagonal 6×6 matrix with values initially chosen to achieve the desired filter performance from flight trajectory simulation.

In order to improve the attitude error estimation portion of the Kalman filter, an adaptive component was added to the State Model Noise Covariance which allowed the filter to respond very quickly to situations in which the reference information is probably corrupted. Two dynamic conditions cause the accelerometer reference of gravity to be corrupted, including:

1. Dynamic acceleration changes due to change-in-velocity maneuvers; and
2. Coordinated Turn Maneuvers (or turns generating significant centripetal acceleration).

Figure 11:
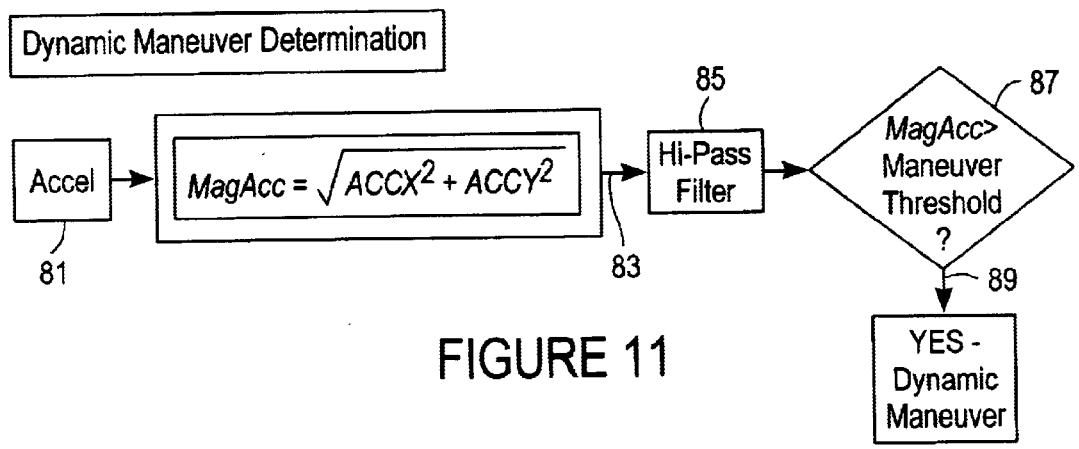
FIG. 11 is a flow chart illustrating one component of an attitude error decision model according to the present invention.

In the first condition, the accelerometers measure the true body acceleration due to a change-in-velocity, which will corrupt its measurement of gravity and can lead to a larger than true attitude reference. In the second condition, the accelerometers measure the combined (null) effect of gravity and centripetal acceleration, which leads to a smaller than true attitude reference. The goal then is to determine when these situations arise and to provide the proper adaptive change to the State Model Noise Covariance. The two components that make up this model are the Dynamic Maneuver Determination Test, and the Coordinated Turn Determination Test, as illustrated in the flow charts of FIGS. 11 and 12. The Dynamic Maneuver Determination Test is based upon the acceleration data obtained from the accelerometers. As defined in the flow diagram of FIG. 11, the three vector accelerations 81 are converted into a lateral/longitudinal magnitude of acceleration term 83 which excludes the Z-acceleration component. This magnitude signal is then passed through a high-pass filter 85 to remove any bias in the signal. The resultant signal provides a measure of the amount of "maneuvering" acceleration sensed by the accelerometers in the X-Y plane. This is the plane of reference used to obtain the attitude with respect to gravity information used by the Kalman filter. The signal is then checked against a threshold value 87 and, if in excess of the threshold value 89, the algorithm assumes that the vehicle is maneuvering and will no longer accept the attitude computation as correct with respect to gravity reference.

Figure 12:
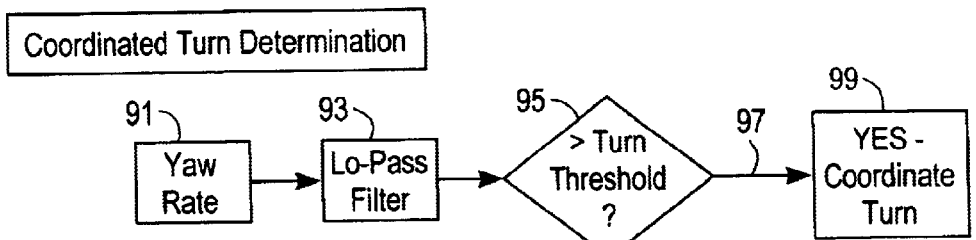
FIG. 12 is a flow chart illustrating another component of an attitude error decision model.

The Coordinated Turn Maneuvers Test is based solely on the yaw gyro signal 91 which is first passed through low-pass filter 93, as shown in FIG. 12, to remove typical yaw turn perturbations due to small flight or body corrections. The signal is then checked against a threshold 95 and, if in excess of the threshold 97, the algorithm assumes the vehicle is in a coordinated turn 99 or other turn maneuver that generates significant centripetal force. The algorithm accordingly lowers the State Model Noise Covariance, which effectively lowers the gain and response of the Kalman filter. With the Kalman filter in a low-gain mode, attitude error build-up during a turn is kept to a minimum by maintaining those gyro bias estimates that were produced prior to the turn maneuver, and lowering the weighting on the accelerometer attitude reference which would otherwise attempt to force the attitude indication toward level.

The measurement model for the filter contains components that are nonlinear in nature. The attitude reference error measurements are direct measurements of the Euler angle errors, and are therefore a nonlinear combination of the quaternion perturbation states. They are obtained by rotating the body measured accelerometer signals into the tangent or level frame, and then calculating the attitude reference error by observing any residual non-level acceleration terms in the tangent and assigning the attitude error measurements based on the magnitude of the residual terms.

The heading reference error is obtained by calculating the heading direction as measured from the leveled magnetometers, and comparing this heading to the current calculated yaw angle obtained from the attitude trajectory that is determined from the integrated quaternion. The heading error measurement then is based on the magnitude of the residual angle error difference between the magnetometer heading and the calculated yaw. The following relationship describes the Kalman filter measurement model:

$$y_{meas} = \begin{bmatrix} \delta roll_{ref} \\ \delta pitch_{ref} \\ \delta yaw_{ref} \end{bmatrix} - \begin{bmatrix} \delta roll_{est} \\ \delta pitch_{est} \\ \delta yaw_{est} \end{bmatrix}$$ (Eq. 19)

$$= \begin{bmatrix} ACCY_{TAN\,residual} \\ ACCX_{TAN\,residual} \\ Heading_{residual} \end{bmatrix} - \begin{bmatrix} f_1(\delta q) \\ f_2(\delta q) \\ f_3(\delta q) \end{bmatrix}$$

$$y_{meas} = C_{meas} * \delta x_{est} + R_{meas}$$

$$y_{meas} = C_{meas} * \begin{bmatrix} \delta \bar{q} \\ g_b \end{bmatrix} + \begin{bmatrix} G_{\bar{b}q} \\ G_{gb} \end{bmatrix}$$

The reference residuals comprise the body accelerometer and magnetometer data and are obtained from the following relationship:

$$ACC_{TAN} = CB2T * ACC_{BODY}$$ (Eq. 20)

$$\begin{bmatrix} ACCX_{TAN\,residual} \\ ACCY_{TAN\,residual} \\ Heading_{residual} \end{bmatrix} = \begin{bmatrix} \text{sign}(ACC_{TANX}) * \theta_{(ADAPT)} \\ -\text{sign}(ACC_{TANY}) * \phi_{(ADAPT)} \\ \text{sign}(Heading_{ERR}) * \psi_{(ADAPT)} \end{bmatrix}$$

$$Heading_{ERR} = \psi_{(yaw)} - Heading_{Mag}$$

$$Heading_{Mag} = \text{atan2}(MAGY_{TAN}, MAGX_{TAN})$$

$$\begin{bmatrix} MAGX_{TAN} \\ MAGY_{TAN} \end{bmatrix} = \begin{bmatrix} \cos(\theta)*MAG_X + \sin(\theta)*\sin(\phi)*MAG_Y + \\ \cos(\phi)*MAG_Z \\ \sin(\phi)*MAG_Z - \cos(\phi)*MAG_Y \end{bmatrix}$$

The angle perturbation estimate functions represent the attitude error that the Kalman filter has estimated up to that point, and are obtained from the following relationship:

$$\tan 1 = 2.0 * (\delta q_2 * \delta q_3 + \delta q_1 * \delta q_0)$$ (Eq. 21)

$$\tan 2 = 1.0 - 2.0 * (\delta q_2 * \delta q_2 + \delta q_1 * \delta q_1)$$

$$\tan 3 = 2.0 * (\delta q_1 * \delta q_2 + \delta q_3 * \delta q_0)$$

$$\tan 4 = 1.0 - 2.0 * (\delta q_2 * \delta q_2 + \delta q_3 * \delta q_3)$$

$$\begin{bmatrix} f_1(\delta q) \\ f_2(\delta q) \\ f_3(\delta q) \end{bmatrix} = \begin{bmatrix} \text{atan2}(\tan 1, \tan 2) \\ \text{asin}(2.0 * (\delta q_0 * \delta q_2 - \delta q_1 * \delta q_3)) \\ \text{atan2}(\tan 3, \tan 4) \end{bmatrix}$$

The measurement matrix $C_{meas}$ in Eq. 19 is calculated as:

$$C_{meas} = \begin{bmatrix} 2*\delta q_0 - \frac{2*\delta q_1^2}{\delta q_0} & 2*\delta q_3 - \frac{2*\delta q_1*\delta q_2}{\delta q_0} & 2*\delta q_2 - \frac{2*\delta q_1*\delta q_3}{\delta q_0} & 0_{1X3} \\ -2*\delta q_3 - \frac{2*\delta q_1*\delta q_2}{\delta q_0} & 2*\delta q_0 - \frac{2*\delta q_2^2}{\delta q_0} & -2*\delta q_1 - \frac{2*\delta q_2*\delta q_3}{\delta q_0} & 0_{1X3} \\ -2*\delta q_3 - \frac{2*\delta q_2*\delta q_4}{\delta q_1} & -2*\delta q_2 - \frac{2*\delta q_3*\delta q_4}{\delta q_1} & -2*\delta q_1 - \frac{2*\delta q_4*\delta q_4}{\delta q_1} & 0_{1X3} \end{bmatrix} \quad (Eq.\ 22)$$

and is the linearized matrix representation that essentially transforms the Kalman filter estimated quaternion perturbation into the Kalman filter measurement attitude reference error.

Measurement noise covariances are defined from the performance of the accelerometers and magnetometers and are contained in $R_{meas}$ in Eq. 19.

A conventional Kalman filter is employed and its function and typical nomenclature for coefficients, and the like, are described below. The filter state and transition matrix is first discretized, and then the discrete time Kalman filter is employed. Since the measurements come in at varying sample rate, a varying-rate filter configuration is employed. During an update, the full Kalman filter is calculated which includes the prediction and correction steps. The equations follow:

$$A_k = (I + \Delta t * A_{state})$$
$$\delta \bar{x}_{pred} = A_k \cdot \delta \bar{x}_{est}$$
$$H = A_k * P_{est} * A_k^T + Q_k$$
$$K = H * C_{meas}^T * (C_{meas} * H * C_{meas}^T + R_{meas})^{-1}$$
$$P_{est} = (I - K * C_{meas}) * H$$
$$v = (Y_{meas} - C_{meas} * \delta \bar{x}_{pred})$$
$$\delta \hat{x} = \delta \bar{x}_{pred} + K * v \quad (Eq.\ 23)$$

The measurement matrix $C_{meas}$ is defined above in Eq. 22, and the state transition matrix $A_{state}$ is defined in Eqs. 17 and 18, and the measurement noise covariance $R_{meas}$ is defined above in Eq. 19. The measurement vector $Y_{meas}$ is defined from the attitude reference error calculation described in the measurement model discussion above and is represented in Eq. 19. The state process noise covariance Qk is a discretized form of the continuous state process noise covariance Q to account for the varying filter sample rate. Each element of the Kalman filter equations of Eq. 23 have been defined previously, and the interim terms such as H, and K and $P_{est}$ are conventional in classic Kalman filter terminology.

Therefore, the apparatus and processes according to the present invention provide a low-cost sensor assembly for platform stabilization systems and for other dynamic positioning and guidance control systems in automotive, marine, and aeronautical applications that require convenient gravity reference.

Appendix A—Sensor Compensation

Raw Sensor Inputs
  ab[3] Accelerations uncorrected (ab[1]=x, ab[2]=y, abl[3]=z
  ωb[3] Rate Sensor uncorrected (ωb[1]=x, ωb[2]=y, ωb[3]=z)
Corrected Sensor Outputs
  ac[3] Accelerations corrected
  ωc[3] Rate Sensor corrected Calibration coefficients
  ba[3] accelerometer bias
  sa[3] accel scale error
  L2[3] accel non-linearity
  bω[3] rate bias
  sω[3] rate scale error
  ma[12] misalignment table
Accelerometer Channel Error
  al[1]=((L2[1]*ab[1]+sa[1]*ab[1]+ba[1])+ab[1]
  al[2]=((L2[2]*ab[2]+sa[2]*ab[2]+ba[2])+ab[2]
  al[3]=((L2[3]*ab[3]+sa[3]*ab[3]+ba[3])+ab[3]
Gyro Channel Error
  ωl[1]=(sω[1]*ωb[1]+bω[1]+ωb[1]
  ωl[2]=(sω[2]*ωb[2]+bω[2]+ωb[2]
  ωl[3]=(sω[3]*ωb[3]+bω[3]+ωb[3]
Accelerometer Compensation for Misalignment
  ac[1]=ma[1]*al[2]+ma[2]*al[3]+al[1];
  ac[2]=ma[4]*al[1]+ma[3]*al[3]*al[2];
  ac[3]=ma[5]*al[1]+ma[6]*al[3]+al[3];
Gyro compensation for misalignment
  ωc[1]=ma[7]*ωl[2]+ma[8]*ωl[3]+ωl[1]
  ωc[2]=ma[10]*ωl[1]+ma[9]*ω[3]+ωl[2]
  ωc[3]=ma[11]*ωl[1]+ma[12]*ωl[2]+ωl[3]

Appendix B—Factory Calibration alev[3]=level frame acceleration/tilt of platform
ac[3]=compensated body frame acceleration readings see Step 2
dc[3][3]=directions cosines matrix
alev[1]=dc[1][1]*ac[1]+dc[1][2]*ac[2]+dc[1][3]*ac[3];
alev[2]=dc[2][1]*ac[1]+dc[2][2]*ac[2]+dc[2][3]*ac[3];
alev[3]=dc[3][1]*ac[1]+dc[3][2]*ac[2]+dc[3][3]*ac[3];

Appendix C—Update Quaternion and Normalize Quaternion

DT=Time change in seconds from last update divided by 2
DQ=Normalization coefficient
a4,b4,c4,d4=temporary quaternion
a,b,c,d=quaternion representation of attitude
ωc[3]=angular rate sampled over DT interval by A/D converter (1,2,3=X,Y,Z respectively)
ωcx=corrective rate signals x generated in Appendix A, para. 7
ωcy=corrective rate signals y generated in Appendix A, para. 7
ωcz=corrective rate signal z (azimuth)
/*compute temporary quaternion as a function of sensed rates and previous quaternion */ a4=DT*((ωc[3]+ωcz)*b−(ωc[2]+ωcy)*c+(−1*ωc[1]+ωcx)*d);
b4=DT*((−1*ωc[3]−ωcz)*a+ωc[1]+ωcx)*c+(ωcy−ωc[2]*d);
c4=DT*(((ωc[2]+ωcy)*a−(ωc[1]+ωcx)*b+(−1*ωc[3]+ωcz)*d);
d4=DT*((ωc[1]−ωcx)*a+(ωc[2]−ωcy)*b+(ωc[3]−ωcz)*c);
/* update quaternion*/
a+=a4;
b+=b4;
c+=c4;
d+=d4;
/* normalize quaternion */
DQ=1−05*(a*a+b*b+c*c+d*d−1);
a*=DQ;
b*=DQ;
c*=DQ;
d*=DQ;

Appendix D—Convert Quaternion to Direction Cosines Matrix d1,d2,d3,c11,c12,c13,c14,c22,c23,c24,c33,c34 Temporary storage
dc[3][3] 3×3 direction cosines matrix
/* compute temporary storage */
d1=a+a;
d2=b+b;
d3=c+c;
c11=d1*a;
c12=d1*b;
c13=d1*c;
c14=d1*d;
c22=d2*b;
c23=d2*c;
c24=d2*d;
c33=d3*c;
c34=d3*d;
/* update direction cosines */
dc[1][1]=1−c22−c33;
dc[2][2]=1−c11−c33;
dc[3][3]=1−c11−c22;
dc[2][1]=c12−c34;
dc[1][3]=c13−c24;
dc[3][2]=c23−c14;
dc[1][2]=c12+c34;
dc[3][1]=c13+c24;
dc[2][3]=c23+c14;

Appendix E—Generate Corrective Rates

Option 1: Proportional Gain
ωcx=−KG*alev[2];
ωcy=KG*alev[1];
Option 2: Non-linear Gain
if (alev[2]>0.0)
    ωcx=−1*UG
else
    ωcx=UG
if(alex[1]>0.0)
    ωcy=UG;
else
    ωcy=−1*UG Appendix F—Heading /Azimuth Corrective Rate ωcz: azimuth corrective rates
ct: cosine of true heading
st: sine of true heading
ωcz=KG *(ct*dc[2][1]−st*dc[1][1])

Appendix G—Extract Euler Angle for Direction Cosines.

Roll,Pitch,Yaw—final outputs in euler angle format
roll=atan (dc[3][2]/dc[3][3])
Pitch=asin (dc[3][1])
heading=atan (dc[3][2], dc[1][1])

What is claimed is:

1. A method for determining an attitude of an accelerating object exclusively from acceleration and angular rate, comprising:
    determining an angular rate of the object to obtain a quaternion representation of attitude;
    converting the quaternion in to a direction cosine matrix;
    determining a level frame acceleration value of the object based upon the direction cosine matrix and an acceleration of the object;
    supplying attitude error and rate sensor bias estimates to a Kalman filter operating on the level frame acceleration value as a reference to determine the attitude of the object.

2. The method of claim 1 in which attitude error estimate includes determining acceleration magnitude from acceleration information along multiple orientation axes excluding gravity orientation; and
    invalidating attitude determination in response to the acceleration magnitude exceeding a selected value as indicative of a dynamic maneuver.

3. The method according to claim 1 in which attitude determination is invalidated in response to yaw rate information exceeding a selected value as indicative of a turn maneuver.

4. The method according to claim 1 including also supplying heading information to the Kalman filter operating on the level frame acceleration value as a reference to determine the attitude of the object.

5. The method according to claim 4 in which heading information includes compass heading data.

6. The method according to claim 4 in which heading information includes magnetometer data.

7. The method according to claim 4 in which heading information includes GPS information.

8. The method according to claim 3 in which yaw rate information supplied to the Kalman filter prior to the indicated turn maneuver is supplied for the duration of the yaw rate information exceeding the selected value.

9. The method according to claim 8 in which the state model noise covariance of the Kalman filter is lowered during the acceleration magnitude exceeding the selected value.

10. The method according to claim 8 in which the weighting of the accelerometer attitude reference is lowered in the Kalman filter during the yaw rate information exceeding the selected value.

11. The method according to claim 1 in which the determination of angular rate of an object includes manipulating the object through a predefined set of maneuvers including an initial position as the final position of the maneuvers, and estimating calibration parameters therefrom.

12. The method according to claim 11 in which a Kalman filter calculates the calibration parameters from acceleration and angular rate data from the object as manipulated through the set of maneuvers.

* * * * *

UNITED STATES PATENT AND TRADEMARK OFFICE
CERTIFICATE OF CORRECTION

PATENT NO.     : 6,647,352 B1
DATED          : November 11, 2003
INVENTOR(S)    : Michael A. Horton It is certified that error appears in the above-identified patent and that said Letters Patent is hereby corrected as shown below:

<u>Title page,</u>
Item [57], ABSTRACT,
Line 1, after "A method and system", please insert -- senses the --.

Signed and Sealed this

Seventeenth Day of February, 2004

JON W. DUDAS
*Acting Director of the United States Patent and Trademark Office*